United States Patent [19]
Donzac et al.

[11] Patent Number: 5,294,383
[45] Date of Patent: Mar. 15, 1994

[54] PROCESS OF MAKING SHAPED MEMBERS LENGTH MADE FROM CARBON-CARBON COMPOSITE MATERIALS

[75] Inventors: Jean-Marc Donzac; Gérard Rousseau; Pierre Terrade, all of Saint Medard en Jalles, France

[73] Assignee: Aerospatiale Societe Nationale Industrielle, Paris, France

[21] Appl. No.: 978,013

[22] Filed: Nov. 18, 1992

[30] Foreign Application Priority Data

Nov. 21, 1991 [FR] France ................. 91 14352

[51] Int. Cl.⁵ .............................. D01F 9/12
[52] U.S. Cl. .................. 264/29.2; 264/29.6; 264/29.7; 264/85; 264/136; 264/148; 423/447.4; 423/447.7; 423/447.8; 427/228; 427/293; 427/377; 427/379; 427/434.6; 427/434.7
[58] Field of Search ............ 264/29.2, 29.6, 29.7, 264/85, 136, 137, 148, 157; 423/447.4, 447.7, 447.8; 427/226, 227, 228, 293, 377, 378, 379, 434.6, 434.7

[56] References Cited

U.S. PATENT DOCUMENTS

| | | |
|---|---|---|
| 4,543,241 | 9/1985 | Yoshinari et al. ............ 423/447.7 |
| 5,205,888 | 4/1993 | Mochida et al. ............ 264/29.6 X |

FOREIGN PATENT DOCUMENTS

| | | | |
|---|---|---|---|
| 59-53719 | 3/1984 | Japan | ................. 264/29.2 |
| 60-21910 | 2/1985 | Japan | ................. 264/29.2 |
| 62-10589 | 1/1987 | Japan | ................. 264/29.2 |
| 62-117875 | 5/1987 | Japan | ................. 264/29.2 |

*Primary Examiner*—Leo B. Tentoni
*Attorney, Agent, or Firm*—Nikaido, Marmelstein, Murray & Oram

[57] ABSTRACT

The process includes impregnating carbon threads with molten pitch in an impregnation tank 4, shaping them by means of a short die 8, subjecting the so-impregnated thread to thermal treatment by progressive heating while it is continuously passed through a treatment furnace 9, then cutting the shaped member when it leaves the furnace.

2 Claims, 3 Drawing Sheets

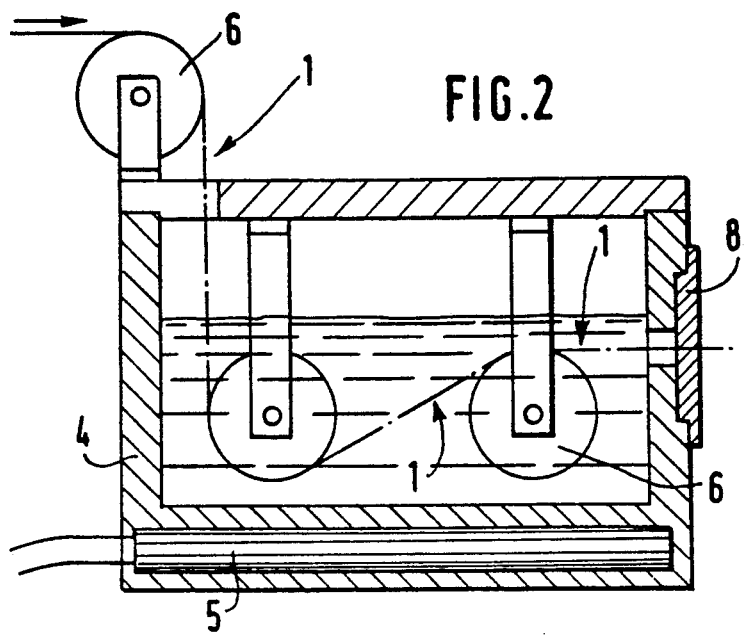
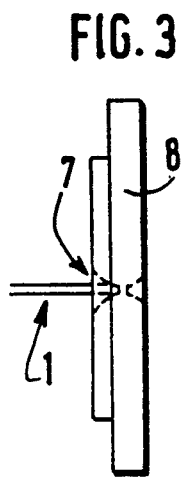
FIG. 2   FIG. 3
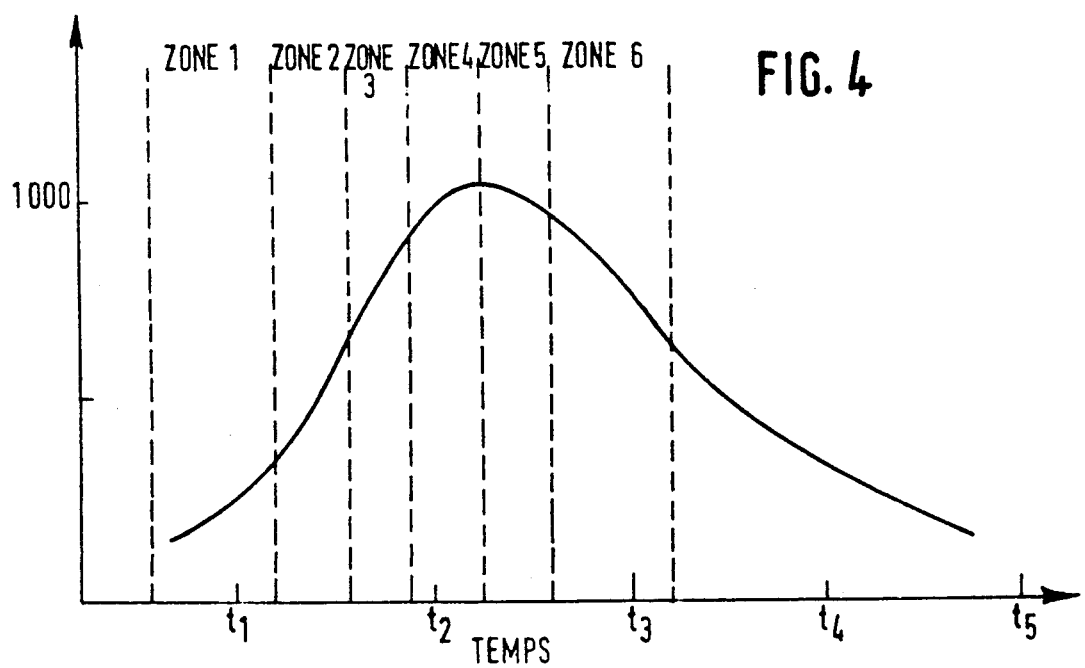
FIG. 4

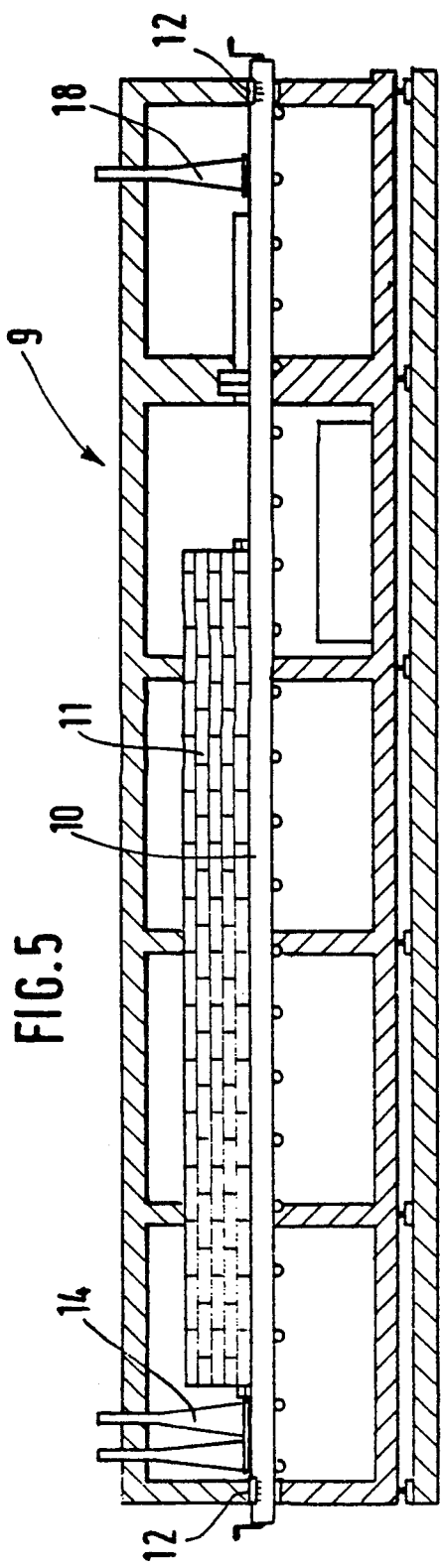
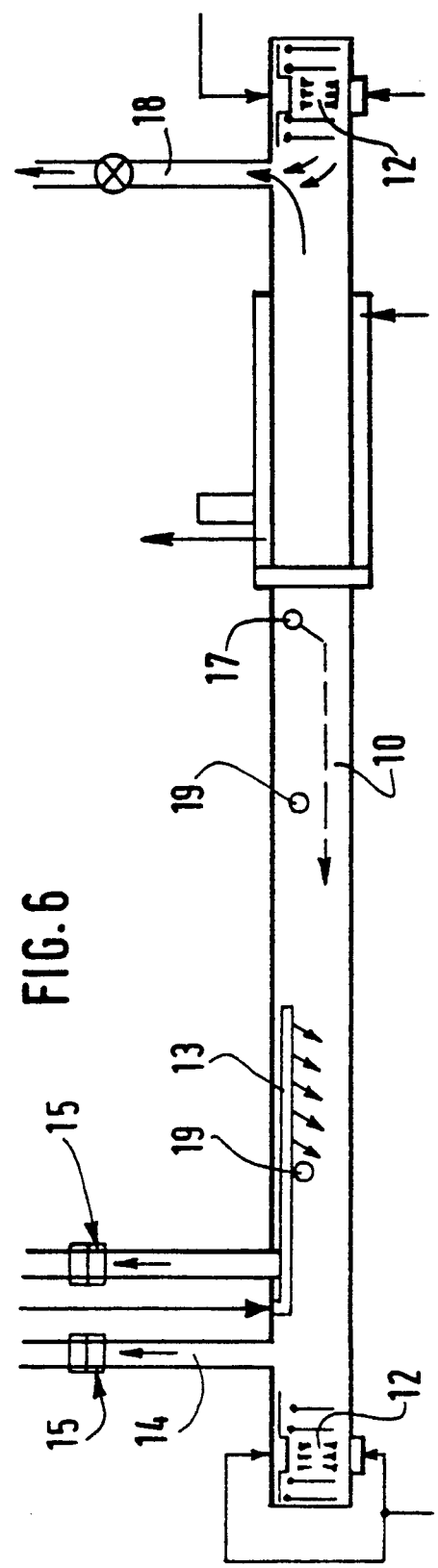
FIG.5
FIG.6

PROCESS OF MAKING SHAPED MEMBERS LENGTH MADE FROM CARBON-CARBON COMPOSITE MATERIALS

FIELD OF THE INVENTION

The invention relates to the continuous manufacture of shaped members made from carbon/carbon composite materials and more precisely rectilinear shaped members of long length and very small cross-section, for example from a few tenths of a millimeter to 1 mm in diameter, obtained with an accuracy of ±5% over lengths of several meters.

BACKGROUND OF THE INVENTION

The shaped members in question, which may or may not be of square cross-section, or in the shape of thin circular bars, may be used in the formation of certain high performance and low density composite materials which can be used in the aerospace industry.

The use of methods of pultrusion, by means of which it is known to calibrate a material by passing it through a die of precise internal cross-section, is well known for the production of threads or shaped members of composite material. In certain cases a shaped die formed by a simple diaphragm of small thickness is used, through which a staple sliver is drawn under force and calibrated after impregnation in a resin bath. In other cases, the thread preimpregnated in that manner is wound on a former of rectangular cross-section such that each preimpregnated rectilinear cord stretched across one side of the former can, after polymerization and cutting, constitute a rigid shaped composite member. Those discontinuous methods of manufacture are best used for shaped members of a length limited to the length of the support frame and therefore cannot be adapted to industrial applications that aim to produce shaped members that are calibrated with the greatest degree of accuracy and are of long length. Indeed the known methods do not allow reproducibility of shaping and cross-section since the setting of the material is effected discontinuously and is not rigorously carried out in an identical manner from one operation to another.

Pultrusion methods, comprising the calibration of a shaped member through one or more dies by means of traction of the shaped member, have allowed an improvement in the products obtained. A pultrusion bench is known generally to be constituted by a continuous unwinding station for dry threads, followed by a tank for impregnating the composite material with resin, the material then being displaced continuously by a traction mechanism inside a long heating die which ensures the shaping of the product and its polymerization. A cutting device for cutting the shaped member into lengths is provided at the outlet of that bench. Such continuous manufacture by that pultrusion method, however, requires a relatively long passing time through the heating die if complete and correct polymerization of the resin is desired without deformation of the shaped member, for example without twisting, and this is accomplished to the detriment of the speed of production. In addition, the die stands in the way of total elimination of volatile products from the resin. Finally, the existence of a single long shaping die does not eliminate completely the jamming of composite material fibrillae at the inlet, since frictional forces are associated with the length of the die and promote jamming. Whether there are several dies or one long die, these jams necessitate numerous manual interventions, especially for the purpose of cleaning, which involves stopping the machine and the loss of time in replacing the thread in the die. It is therefore not possible to use those dies for the manufacture of carbon/carbon shaped members of small cross-section since the shaped members would break.

This method of manufacture by means of a long heating die is not suitable for carbon/carbon composite material shaped members of small cross-section, that is to say, of a cross-section smaller than 1 mm. Indeed the use of that method is very tricky since the pultrusion force necessary for the shaping is significant and might cause breakage of the carbon fibers. Furthermore, the alignment of the dies is critical and it would not be possible, owing to the duration of the production, to be assured of continuous manufacture over long lengths.

SUMMARY OF THE INVENTION

The aim of the invention is therefore to provide a method for the industrial production of shaped members of carbon/carbon composite material of long length, for example several meters, that have a very small cross-section, that is to say less than 1 mm, which is continuous, less costly and automatic. It will be possible to obtain by that means shaped members of round, square or other cross-section as well as rigid strips, or plates, and even sheets of small thickness and some dozens of centimeters in width.

A main object of the present invention is thus a process for the continuous manufacture of shaped members of carbon/carbon composite material of small cross-section and long length which comprises impregnating carbon threads in molten pitch before they are shaped by a short die, subjecting the so-impregnated thread to a thermal treatment by progressive heating while it is continuously unwound in a tunnel furnace, in a controlled atmosphere, between two support points outside the furnace so that displacement is effected without the use of tools, the advance of the soft shaped member in the furnace being effected by traction of the rigid shaped member from the support point at the furnace outlet, and cutting the shaped member when it leaves the furnace to produce shaped member elements of the required length. The impregnated threads unwind in the heating cell of the treatment furnace with successive zones of increasing treatment temperatures up to a temperature preferably capable of reaching 1100° C., then decreasing treatment temperatures, gas barriers preventing ambient air from entering inside the cell.

The invention relates also to a device for carrying out the process according to which there is arranged upstream of the treatment furnace at least one impregnation tank, at the outlet of which the thread passes through a short die.

According to another feature of the invention, the muffle which forms the heating cell is provided at each end with nitrogen injection gas barriers, a neutral gas also being injected into the inside of the muffle through a tube.

The treatment furnace is provided with flues for collecting the vapours from pyrolysis and evacuating them through a fume conduit, and a second means of injecting neutral gas provided at the end of the muffle ensures that it is flushed, a further flue also being provided in the cooling zone.

DESCRIPTION OF THE DRAWINGS

Other particular features and advantages of the invention will be apparent on reading the description, which follows, of one embodiment referring to the attached drawings which show:

FIGS. 2 and 3: schematic views, in section and in profile, of an impregnation tank, FIG. 4: a graph of treatment temperatures, FIGS. 5 and 6: elevations of the treatment furnace.

DESCRIPTION OF THE PREFERRED EMBODIMENTS

Figure 1:
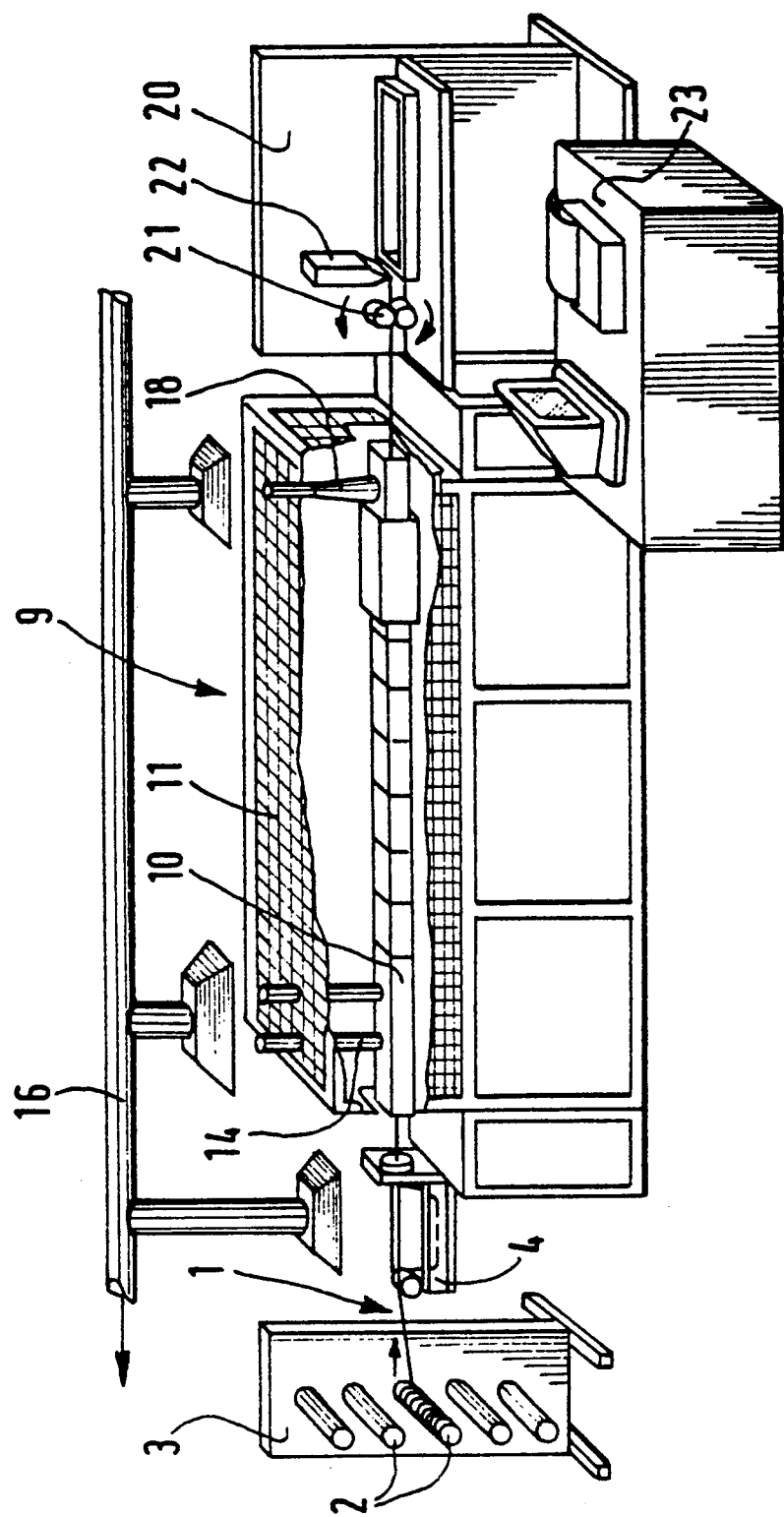
FIG. 1: a perspective view of the entire manufacturing unit.

The manufacturing installation shown in FIG. 1 comprises, at the beginning of the chain, a stand 3 of reels 2 for paying out several lines of thread 1. The stand comprises as many reels 2 as there are shaped members to be produced. The reel supports are rotatable and lightly braked by mechanical means. A sensor system, not shown, ensures that the rotation of the reel is monitored and a sensor controls the motor of the drive and cutting system which will be referred to later with a view to the triggering of an alarm if a thread ruptures. The stand 3 is surrounded by an impervious protective housing to prevent any escape of carbon fibrillae to the outside and to provide an obstacle to the admission of outside contamination.

The threads 1 paid out by the reels 2 then each enter into one of several impregnation tanks 4 arranged one next to another close to the stand 3. Each tank, shown in more detail in FIG. 2, is heated, by means of a heating rod 5, to such a temperature that the pitch reaches a viscosity suitable for the impregnation, the temperature being predetermined, accurately regulable and independently controlled for each tank. Each tank can be removed independently and easily from its heating element so that it can be handled by the operator and subjected to cleaning operations. Its internal linings are advantageously made of stainless steel, and the impregnation liquid it contains is molten pitch. The path of a thread inside a tank is determined by a set of rollers 6 also made of stainless steel, which can be moved away so as not to obstruct removal of the tank. They are themselves easily removable.

At the outlet of the impregnation tank the thread passes through a short die 8, the profile of which is shown more clearly in FIG. 3. The hole 7 of the die is calibrated to provide an impregnated thread of extremely precise cross-section.

At the outlet of the die the preimpregnated soft shaped members 1 enter into a treatment furnace 9 in which a heating cell 10 is formed by several successive zones numbered from 1 to 6 which correspond to treatment temperatures capable or reaching 1100° C. (zone 4 and 5) as illustrated by the graph in FIG. 4. The zone temperatures of the heating cell are plotted on the ordinate and the unwinding times of the threads or shaped members are plotted on the abscissa in seconds, t1, t2, t3, t4, t5. The time is a function of the speed of unwinding, for example of the order of a few meters/minute. The cell 10 is encased in refractory bricks 11. Heating elements, not shown, protected by silicon carbide plates, ensure uniform distribution of the heat. It is possible without removing heat insulation from the cell to gain access to the heating elements and remove them. The transverse homogeneity is ±1° C. on one level.

Thermoelectric couples for regulation and anti-overheating safety are provided especially in each treatment zone, and they are readily accessible for maintenance operations. The accuracy of their measurement is ±5° C.

The impervious and anticontaminant muffle 10 constituting the heating cell described above is also visible in FIG. 5 as well as in the diagram in FIG. 6. A nitrogen injection gas barrier 12 is arranged at each end of the muffle and prevents penetration of ambient air to the inside of the muffle. At the beginning of the muffle and at the level of the first regulation zone there is a means of injecting neutral gas into the inside of the muffle through a tube 13. Similarly, a means of aspirating the vapour from pyrolysis is provided by flues 14 fitted with air or nitrogen venturis 15. The discarded vapours are collected by a hood and a fumes conduit 16 (FIG. 1).

A second means 17 of injecting neutral gas is situated at the end of the muffle 10. This gas flushes the length of the muffle and is extracted by the venturis 15. A third flue 18 situated at the end of the muffle allows a certain flow of neutral gas to be maintained in the cooling zone and a collecting means is also provided above that third flue.

The thermal regulation is effected by wave train. The temperature display is in the range of 100° C. to 1100° C. There is a system of regulation by heating zone and, when there is a deviation from the admissible range, an audible and visual alarm is triggered. Furthermore, mass flow meters regulate the supply of gas to the extraction venturis, the two gas barriers and the injection means in the muffle. Sensors 19 are also provided in the muffle which continuously supply information on the quality of the atmosphere. Obviously, anti-overheating safety devices, alarm devices for the oxygen threshold, devices for alerting to lack of water etc. are provided.

Referring to FIG. 1, there is arranged at the outlet of the treatment furnace 9 the thread drive mechanism 20. The latter is essentially formed by interchangeable rollers 21 which pinch the shaped member. The latter is not damaged since the rollers are coated with a mild non-contaminating material and the pressure they exert is regulable. The drive speed can be modified but in the operating phase it is constant and jerk-free.

It will be noted that in the furnace the shaped member forms a continuous line stretched between two support points outside the furnace. The first support point is formed by the die 8. The second support point at the outlet of the furnace is formed by drive rollers 21 which exert traction on the shaped member and stretch it. There is thus no contact with the shaped member in the furnace and there are no tools. As it advances in the furnace, the shaped member, which is soft at the inlet, will progressively harden and will exit the furnace hardened. There is neither vibration nor friction, and it is possible to obtain, without breakage, shaped members of carbon/carbon composite material of small cross-section and long length.

At the outlet of the rollers 21, a cutting system 22 is provided after each drive system.

It will be noted that there are as many drive systems and hence cutting systems as there are threads passing through the furnace. Each functions independently of the one adjacent to it. The cutting speed is directly associated with the drive speed of the thread, and is sufficiently rapid not to be detrimental to the continuous unwinding.

A control station 23 ensures management of the system for monitoring the unwinding of the thread, thermal regulation of the impregnation tanks and of the treatment furnace, regulation of the gas flows, monitoring of the atmosphere and programming of the number of cuts to be carried out per shaped member. It controls all the monitoring devices associated with each subassembly and has an emergency stop means.

The device so described makes it possible to obtain shaped members of carbon/carbon composite material of long length and very small cross-section.

The continuous thermal treatment applied has made it possible to transform the pitch into a coke of sufficient quality to obtain a composite with a good quality matrix, without deformation of the piece during the course of treatment, which would not have been possible by means of a conventional process by chemical deposition in the gaseous phase. The quality of the matrix is such that the thermal treatment does not involve any deformation of the shaped member, which makes it possible to obtain continuously and at the smallest cost an extremely sound product.

We claim:

1. A process for the continuous manufacture of shaped members of small cross-section and long length made from carbon-carbon composite materials comprising the steps of:

impregnating carbon threads in molten pitch to form a soft shaped member before shaping by a short die;

subjecting the so-impregnated thread to a thermal treatment to form a rigid shaped member by progressive heating while continuously passing through a tunnel furnace, in a controlled atmosphere, and while being supported between first and second support points located outside the tunnel furnace so that displacement of said thread inside the tunnel furnace is effected without contact within said tunnel furnace and without the use of tools within the tunnel furnace, an advance of the soft shaped member in the tunnel furnace being effected by traction of the rigid shaped member on the second support point located at an outlet of the tunnel furnace, wherein the first support point is said short die; and cutting the rigid shaped member upon leaving the tunnel furnace to produce shaped member elements of a required length.

2. A manufacturing process according to claim 1, further comprising the step of subjecting the impregnated threads advancing in a heating cell of the tunnel furnace to successive zones of increasing treatment temperatures up to a temperature capable of reaching 1100° C., then to successive zones of decreasing treatment temperatures, gas barriers preventing ambient air from entering inside the tunnel furnace.

* * * * *